(12) United States Patent
Havens et al.

(10) Patent No.: US 8,938,908 B2
(45) Date of Patent: *Jan. 27, 2015

(54) FISHING GEAR WITH DEGRADABLE COMPONENT

(71) Applicant: College of William and Mary, Williamsburg, VA (US)

(72) Inventors: Kirk J. Havens, Plainview, VA (US); Donna Marie Bilkovic, Gloucester Point, VA (US); David M. Stanhope, Hayes, VA (US); Kory T. Angstadt, Gloucester, VA (US)

(73) Assignee: College of William and Mary, Williamsburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,465

(22) Filed: May 15, 2014

(65) Prior Publication Data

US 2014/0245655 A1    Sep. 4, 2014

Related U.S. Application Data

(63) Continuation-in-part of application No. 13/771,661, filed on Feb. 20, 2013, now abandoned, which is a continuation-in-part of application No. 13/403,083, filed on Feb. 23, 2012, now abandoned, which is a continuation-in-part of application No. 12/714,370, filed on Feb. 26, 2010, now Pat. No. 8,375,623, which is a continuation-in-part of application No. 12/394,917, filed on Feb. 27, 2009, now abandoned.

(60) Provisional application No. 61/032,266, filed on Feb. 28, 2008.

(51) Int. Cl.
*A01K 69/06* (2006.01)
*A01K 69/08* (2006.01)

(52) U.S. Cl.
CPC .............. *A01K 69/08* (2013.01); *A01K 69/06* (2013.01)
USPC ....................................................... 43/100

(58) Field of Classification Search
CPC ........ A01K 69/06; A01K 69/00; A01K 69/10
USPC .............................. 43/100–105, 4, 4.5, 43.12
See application file for complete search history.

(56) References Cited

U.S. PATENT DOCUMENTS

| 5,281,691 A * | 1/1994 | Hubbs et al. ................. 528/361 |
| 5,351,435 A | 10/1994 | Hill |
| 5,594,076 A | 1/1997 | Gordon, III |
| 5,890,316 A | 4/1999 | Rodgers |
| 5,894,694 A | 4/1999 | Erlandson |

(Continued)

OTHER PUBLICATIONS

Bilkovic, Havens, Stanhope, and Angstadt, "Use of Fully Biodegradable Panels to Reduce Derelict Pot Threats to Marine Fauna", Conservation Biology, (2012) vol. 26, No. 6, p. 957-966.

*Primary Examiner* — Darren W Ark
*Assistant Examiner* — Timothy Schwarz
(74) *Attorney, Agent, or Firm* — Jason P. McDevitt

(57) ABSTRACT

Herein we describe fishing gear having a polyhydroxyalkanoate degradable component, as well as methods for ensuring that such gear has reduced functionality after becoming derelict. Derelict fishing gear has a negative economic and ecological impact, and thus it is advantageous to use gear that will lose the ability to catch and retain fish over time. Incorporating a degradable apparatus into such gear provides an effective, economical solution. Suitable degradable components are described herein.

15 Claims, 11 Drawing Sheets

(56) References Cited

U.S. PATENT DOCUMENTS

| | | |
|---|---|---|
| 2005/0229477 A1 | 10/2005 | Gomez, Jr. |
| 2007/0261292 A1 | 11/2007 | December |
| 2009/0249681 A1 | 10/2009 | Havens |
| 2010/0186283 A1 | 7/2010 | Havens |

* cited by examiner

FISHING GEAR WITH DEGRADABLE COMPONENT

CROSS-REFERENCE TO RELATED APPLICATIONS

This application is a continuation-in-part of co-pending U.S. patent application Ser. No. 13/771,661, filed on Feb. 20, 2013, which is a continuation-in-part of abandoned U.S. patent application Ser. No. 13/403,083, filed on Feb. 23, 2012, which is a continuation-in-part of U.S. patent application Ser. No. 12/714,370 (issued on Feb. 19, 2013 as U.S. Pat. No. 8,375,623), filed on Feb. 26, 2010, which is a continuation-in-part of abandoned U.S. patent application Ser. No. 12/394,917, filed Feb. 27, 2009, which claims the benefit of and priority to U.S. Provisional Patent Application Ser. No. 61/032,266, filed Feb. 28, 2008, the entire disclosures of which are incorporated by reference herein.

STATEMENT REGARDING FEDERALLY SPONSORED RESEARCH AND DEVELOPMENT

This invention was made with government support under Grant Numbers NA17AC2806, NA06NOS4630027, and NA09NMF4520027, awarded by the National Oceanic and Atmospheric Administration. The government has certain rights in the invention.

FIELD OF INVENTION

The field of the invention relates to fishing gear and methods for catching crabs, crustaceans, fish, or other aquatic species.

BACKGROUND OF THE INVENTION

Derelict (i.e., lost or abandoned) commercial fishing gear, including nets and traps, can present safety, nuisance, and environmental impacts in freshwater and estuarine waters. Organisms, such as crabs and fish species, that become entrapped and thereafter die in derelict traps can act as an attractant to other animals, resulting in a self-baiting effect. Derelict fishing gear damages sensitive habitats and continues to capture both target and by-catch species, a process known as "ghost fishing", leading to reduced fitness and delayed mortalities. Animals captured in derelict traps can experience starvation, cannibalism, infection, disease, and prolonged exposure to poor water quality (i.e., low dissolved oxygen).

The effect of derelict fishing gear is significant, and various states and regions have enacted measures to reduce the ecological and economic impacts of ghost fishing. For example, the state of Florida enacted regulations (CH 46-45, F.A.C., effective Jan. 1, 1995) establishing degradability requirements for blue crab traps. Traps are considered legal in Florida if a non-degradable trap lid (such as a metal panel) is secured to the trap using degradable materials such as jute twine or corrodible hooks. These materials have an unpredictable rate of degradation, and therefore cause prolonged ghost fishing after the gear becomes derelict. By the time the degradable connectors degrade, the trap lid is often not released due to factors unique to aquatic environments (e.g., barnacles and mussels create secondary attachment points). For example, many blue crab traps having such degradable connectors continue to trap and retain aquatic species long after the degradable part has degraded. This unpredictability related to degradable materials in aquatic environments also arises with lobster traps, nets, and other fishing gear.

To be functional, an aquatic trap must have an entrance into the enclosed space. For blue crab traps, the entrance is called a throat, which is typically a one-way funnel extending into the trap. For example, the state of Florida enacted regulations that specify the throat must be horizontally oriented and extend inward from a vertical wall less than 6 inches. (CH 46-45, F.A.C.) The aquatic trap often contains an additional opening no smaller than the throat. Unobstructed, this opening would serve as an exit for all species that enter the trap. Fisherman must obstruct the exit in compliance with local, state, and regional regulations. For instance, in Florida, the exit can be obstructed with a non-degradable trap lid connected to a trap via degradable jute twine or corrodible hooks. However, as noted previously, existing connectors and panels obstructing the exit fail to disconnect and thereby fail to release all captured species. This is because materials such as jute twine and corrodible hooks fail degrade in a predictable manner when immersed in aquatic environments. Therefore, ghost fishing continues despite best efforts by both elected officials and fishermen.

It is desirable for crab traps to have cull rings, also called escape rings or escape hatches, to allow small and juvenile crabs to escape the trap. Typically, such cull rings have an inside diameter of at least 2.25 inches. For example, the state of Florida requires all blue crab traps to have at least 3 unobstructed escape rings installed, each with a minimum inside diameter of 2.375 inches. (CH 46-45, F.A.C.) Lobster traps also are required to have escape hatches of varying sizes, with the size dependent on the jurisdiction. Applicants' previous applications, cited above and incorporated by reference herein, address a modified cull ring panel that incorporates a cull ring and obstructs an exit. When the cull ring panel is exposed to a marine environment, the panel degrades and the exit becomes unobstructed, whereby all species that enter the trap may escape.

There remains a need for improved fishing gear that, within a period of months after it becomes derelict, loses its ability to trap aquatic species. Ideally, any such implementation would not functionally degrade while being actively fished, but functionally degrade within a period of time after becoming derelict. We have identified a degradable plastic, polyhydroxyalkanoate (PHA), as an exceptional material for such purposes. The present invention modifies existing fishing gear with an apparatus that both connects to the gear and obstructs an exit when the equipment is being actively fished. When the gear becomes derelict, a component of the apparatus comprising a polyhydroxyalkanoate polymer degrades, whereby the exit is no longer obstructed. To reduce the economic burden on fishermen, it would be advantageous if the degradable component could be inexpensively incorporated into existing fishing gear, thereby providing the desired degradability without requiring the purchase of expensive new equipment.

BRIEF SUMMARY OF THE INVENTION

A modification to mitigate the impact of ghost fishing may be considered a viable and effective option if: 1) the modification renders the fishing gear ineffective at capturing aquatic life within a year of abandonment of the gear, preferably sooner; 2) any material used in the modification, once degraded, is environmentally benign; 3) the modification is relatively inexpensive and easy to install in order to be of practical use; and 4) catches of targeted species are maintained (i.e., the modification does not repel species or fail during a fishing season). To meet the above criteria, we developed a plurality of embodiments that functionally degrade in a predictable manner both when actively fished and when continuously submerged. When the gear is actively fished, an apparatus acts to obstruct the exit and connect to the fishing gear, wherein at least one component of the apparatus comprises a polyhydroxyalkanoate polymer (PHA). After prolonged exposure to the aquatic environment, the component degrades, thereby causing the exit to be unobstructed. The exit is comparable to or larger than the size of the entrance, and therefore allows the escape of any species that enters the derelict fishing gear.

There are two key functional requirements. First, the apparatus must physically prevent the escape of the targeted species for a targeted period of active fishing; for example, one fishing season. Since the duration of a fishing season varies according to the regulations for particular species in particular states, the targeted durability varies for the degradable component blocking an exit of the apparatus. For example, in some of our field trials, we have selected a preferred duration of approximately eight months (a lengthy season), during which the apparatus should remain intact. Second, the degradable component must functionally degrade within an eight month time period after the fishing gear is abandoned—during which time the abandoned fishing gear, and the apparatus contained therein, are continuously soaked in an aquatic environment—such that the apparatus no longer physically prevents escape of the targeted species. In other representative embodiments, the degradable component is designed to degrade within about 12 months, 10 months, 6 months, 4 months, or 2 months after being abandoned. In representative embodiments, the degradable component is designed to maintain functional durability while being fished for, for example, 10 months, 8 months, 6 months, 4 months, or two months, depending on the targeted species and the locality.

Assuming a consistent rate of decay throughout both the period when the gear is actively fished and when it becomes derelict, then it would be almost impossible for a material to fulfill both of the functional requirements described above. In other words, if the decay rate is consistent, then in order to ensure sufficient durability during a targeted period of active fishing, for example 8 months, degradable components would not be assured of failing within a period of less than 8 months after becoming derelict (e.g., if the fishing gear was abandoned during the early phases of the intended 8-month fishing period). Likewise, assuming a constant decay rate, in order to ensure sufficient durability during a targeted period of active fishing of 4 months, degradable components would not be assured of failing within a period of less than 4 months after becoming derelict.

However, polyhydroxyalkanoate (PHA) has certain unexpected properties. This material has two distinct rates of decay depending on whether the fishing gear is actively fished or continuously submerged. During the time that the gear is actively fished, the gear is mostly submerged, but is regularly brought to the surface to harvest the catch. When gear becomes derelict, the apparatus continuously soaks in the aquatic environment. PHA has the unexpected advantage of degrading substantially more slowly when actively fished in an aquatic environment than when continuously soaked in an aquatic environment. Therefore, a novel feature of the present invention is that the degradable component degrades more slowly when actively fished in an aquatic environment than when continuously soaked in an aquatic environment.

Herein we describe modified fishing gear to reduce ghost fishing by incorporating a degradable component that comprises a polyhydroxyalkanoate polymer. The fishing implement, such as a net or trap, has a boundary defining an enclosed space sufficient to house a targeted species. The modified fishing gear has an entrance in the boundary sufficient to allow the targeted species to enter the enclosed space, and an exit in the boundary, wherein the exit is at least as large as the entrance. Further, the modified fishing gear has an apparatus that both obstructs the exit and connects to the trap. A component of the apparatus comprises a polyhydroxyalkanoate polymer, which has the unexpected property of degrading faster when continuously soaked in an aquatic environment than when it is periodically removed from an aquatic environment and exposed to, for example, light and air. For instance, the component comprising PHA degrades by weight at least twice as much when the gear is continuously submerged for three months than when the gear is actively fished for three months. In other words, components made from PHA have the unexpected advantage of degrading at a faster rate once continuously submerged than while being actively fished.

Herein we describe a method of utilizing fishing gear to reduce ghost fishing by incorporating a degradable component that comprises PHA. The method comprises the steps of providing an apparatus that both obstructs the exit and connects to the trap. A component of the apparatus comprises PHA. The apparatus is capable of retaining a targeted species within a fishing implement, such as a net or trap. The fishing gear is exposed to an aquatic environment, causing the degradable component to degrade. Once functionally degraded, the exit becomes unobstructed and the targeted species is released from the fishing gear.

While degradable components can in theory be made from any material that degrades under typical use conditions, the methods and apparatus of the present invention require that the degradable components are made from a polyhydroxyalkanoate polymer. In some embodiments, the components are made from polyhydroxyalkanoate polymers having a tensile strength of at least 23 mPa when subjected to ASTM method D638, and a tensile elongation at break of at least 6% when subjected to ASTM method D638. This combination provides sufficient strength and toughness under use conditions to reduce the likelihood of premature failure due to brittleness. Moderating the rate of degradation can be achieved, for example, by altering any of a number of factors, including but not limited to: the molecular weight of the polymer, the composition of monomer building blocks, the choice of or concentration of plasticizer of other additives, a coating on the polymer, surface imperfections, or the design of the degradable component, in particular its thickness.

BRIEF DESCRIPTION OF THE DRAWINGS

The summary above, and the following detailed description, will be better understood in view of the drawings which depict details of preferred embodiments.

DETAILED DESCRIPTION OF THE INVENTION

Figure 1:
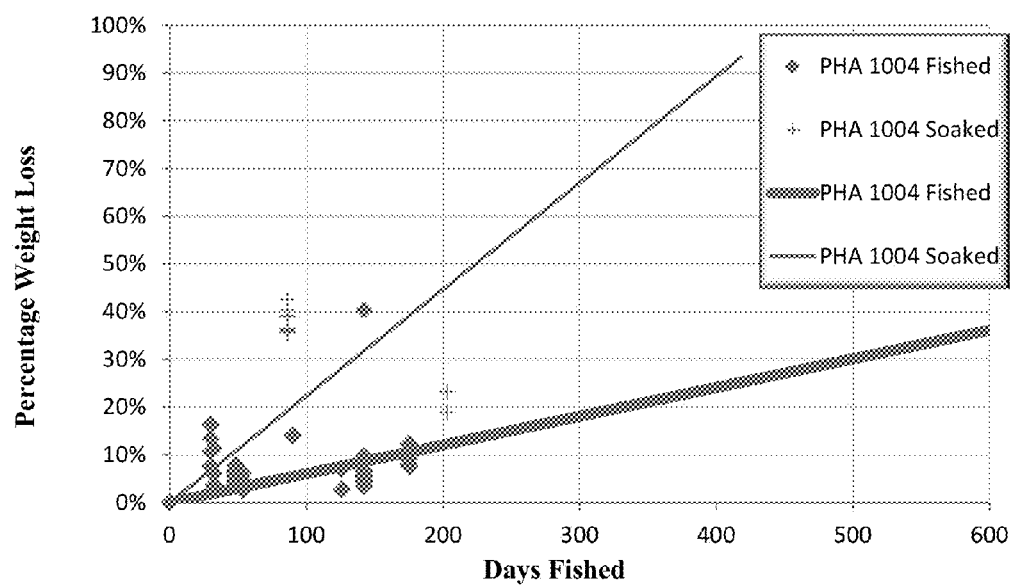
FIG. 1 shows a line graph plotting, as a function of time, the percentage loss of weight of polyhydroxyalkanoate (PHA) degradable cull panels that were either fished or continuously soaked. Individual data points from field trials, as well as the lines of best fit for the fished and continuously soaked degradable cull panels, are shown.

The present invention is directed to fishing gear having a degradable component, and methods for reducing ghost fishing by using a degradable component in fishing gear that may eventually become derelict. The term "fishing gear" or "fishing implement" refers to traps, nets, and other known devices that function to retain a targeted species within an area or volume. The present invention is not limited to metal traps, but includes traps, nets, and other gear of various materials such as wood and plastic. This fishing gear could benefit from a degradable component that has a predictable, dual rate of decay depending on whether the gear is actively fished versus continuously submerged.

The term "component" refers to either a panel, slat, gate, cull ring panel (also referred to as cull panel), cull ring (also referred to as an escape ring, which is frequently circular in shape but can also refer to escape hatches that are not circular), or other known device that functions to obstruct an exit of the fishing gear; or a connector or fastener including wire, twine, nails, screws, staples, clips, hinges, ties, or other known devices that function to connect to the fishing gear. Therefore, a component can be secured to fishing gear either directly (if the component is a fastener, for instance) or indirectly (if the component is a panel, for instance).

A "degradable component" refers to a "component" comprising a polyhydroxyalkanoate polymer (PHA). The degradable component breaks down under aquatic conditions to yield an opening in the fishing gear that permits trapped fish, shellfish, or other aquatic species to escape. The degradable components herein described can be used with traps for various types of fish and shellfish including but not limited to crabs (e.g., *Callinectes sapidus* (blue crab), *Metacarcinus magister* (Dungeness crab), *Paralithodes camtschaticus* (red king crab), and *Chionecetes* spp. (snow crabs)), lobsters (e.g., *Homarus americanus* (American lobster) and *Panulirus argus* (Caribbean spiny lobster)), fish (e.g., black sea bass (*Centropristis striata*) and sablefish (*Anoplopoma fimbria*)), or any other aquatic species. The degradable components can also be used for nets, and other fishing gear designed to retain a targeted species. The degradable components can be used in all coastal and ocean trap fisheries, as well as in lakes and rivers.

"Functional degradation" refers to the failure of the degradable component such that an exit becomes unobstructed, therefore aquatic species can escape from the fishing gear. Note that functional degradation of a component does not require complete degradation at the time of failure. Instead, the degradable component can fail in many different ways. For example, a large hole can open up within the component, or the component can fracture such that a large piece falls off, or the component can become detached from one or more points to which it was attached to the fishing gear (i.e., such that it is partially or fully detached from the trap), or any other means or combinations thereof to provide an exit through which aquatic species can escape. Subsequent to the time of failure, the degradable component of the present invention will completely degrade in an aquatic environment.

Various fisheries have different interests in the time to failure (due to different lengths in fishing seasons) and degradable components can be designed to meet those different time frames. The time to failure is further complicated by the fact that underwater aquatic environments can have substantial variability in terms of pressure, temperature, salinity, and biodiversity, all of which can impact the rate of degradation. Across the board, there are two important time considerations with respect to the durability and degradation of the component.

The first functional requirement is that the degradable component must remain intact for a commercially reasonable time period. In other words, a degradable component that needs to be replaced weekly would likely not be commercially viable. In some embodiments, it is desirable for the degradable component to remain functionally intact for an entire fishing season during normal use. Fishing seasons vary by jurisdiction, and can be as short as a matter of days or as long as year-round. More typically, fishing seasons for targeted fish in fishing traps extend for periods of about three months to about nine months. This functional requirement for the degradable component will prevent loss for commercial fisherman, an important feature for any new technology. Since fishermen do not want "solutions" to the problem of ghost fishing that are costly in terms of money or labor, any commercially viable degradable component should last at least several months during routine fishing conditions. It would be particularly problematic if degradable components fail while being actively fished, as an entire trap full of the targeted species, e.g., lobsters or black sea bass, could then escape, costing the fishermen significant money and reducing the likelihood that the fishermen would subsequently use or recommend the product.

The second functional requirement is that the degradable component must functionally degrade quickly after the fishing gear becomes derelict. When fishing gear is abandoned, the component is continuously submerged in an aquatic environment. The component should functionally degrade to allow the targeted species to escape within eight months, and preferably within six months, from the time of abandonment. It is important for a degradable component to break down quickly once the fishing gear becomes derelict. For example, it would be problematic if a derelict pot was pulled up from the bottom of the Chesapeake Bay two years after being abandoned, and the supposedly degradable component was still intact, and the trap was still capturing and retaining blue crabs.

This is a difficult balancing act, as one would like a degradable component that has (i) little or no chance of degrading sufficiently to the point of functional degradation to allow the targeted species to escape while being actively fished, yet (ii) quickly degrades to the point of functional degradation once the fishing gear becomes abandoned such that the gear no longer effectively fishes and thus does not deplete the fishery. It is not easy to balance the need for sufficient durability while the trap is actively fished with the need for rapid degradation once a trap becomes derelict.

However, these two periods of use have distinctive patterns of use and exposure to environmental conditions. During the time that the gear is actively fished, the degradable component is mostly submerged in an aquatic environment and is periodically brought to the surface to harvest the targeted species. When fishing gear becomes derelict, the degradable component continuously soaks in the aquatic environment. Assuming a linear rate of decay throughout both the period when the gear is actively fished and when it becomes derelict, then it would be almost impossible to satisfy the above-described balancing act. In other words, assuming this linear decay, if sufficient durability was ensured during the period of active fishing of eight months, then degradable components would not be assured of failing within a period of less than eight months of becoming derelict.

Fortunately, we have identified a polymer, PHA, which degrades in an aquatic environment and has the unexpected advantage of degrading substantially more slowly when actively fished in an aquatic environment than when continuously soaked in an aquatic environment. A component comprising PHA can have sufficient durability while the trap is actively fished, but rapidly degrades once a trap becomes derelict. In other words, a degradable component can be designed that physically prevents escape of the targeted species during a single active fishing season of, for example, three months, but functionally degrades when continuously soaked in an aquatic environment for three months, such that the all species that enter the fishing gear can escape. Accordingly, it is important that the decay rate during continuous soaking for three months is at least twice as high as the decay rate during active fishing for three months. The degradable component can be inexpensively incorporated by fisherman and prevent prolonged ghost fishing.

In the examples that follow, degradation is determined by monitoring the weight of (dried) degradable components. Obviously, weight loss does not perfectly predict time to failure. There are many variables that impact when and if a degradable component will fail (i.e., when it will allow the targeted mature aquatic species to escape the fishing gear through all or part of the degradable apparatus). Degradation is usually not consistent throughout the component. For example, if there is sufficient degradation around two attachment points to a crustacean trap, then crustaceans typically can escape. The crustaceans themselves have an influence by grabbing and clawing relatively weak points. Furthermore, the injection molding process can have an influence. Imperfections in the degradable components (i.e., due to poor polymer flow) can increase the likelihood of failure. Handling of the fishing gear and degradable components can have an impact, and obviously the water conditions and local environment will have an effect on the time to failure.

The polyhydroxyalkanoate polymer Mirel™ P1004 is a particularly well suited material for a degradable component. In a long term study of degradable cull panels made from PHA, panels were deployed in crab traps that were either actively fished or submerged continuously (see Example 1 below). Typically, functional degradation with this design and weight of cull ring panel is unlikely to occur until degradation by weight exceeds 20%, while functional degradation is very likely to occur when degradation by weight exceeds 40%. In other words, provided the extent of degradation is less than 20%, the degradable cull panel is generally still suitable for use in fishing. Between 20% and 40% degradation, failure is fairly likely, and fishing with the degradable cull panel would not be advisable, since functional degradation could occur with a trap full of valuable crabs or lobsters. Above 40% degradation, it is likely that the degradable cull panel will fail, and the targeted crustacean species could escape. With the plastics and designs used in Example 1, an ideal degradable cull panel: (i) will not reach 20% degradation for at least 8 months while the panel is regularly fished, and (ii) will reach 20% degradation, and ideally 40% degradation, within 8 months or sooner of being continuously submerged.

FIG. 1 compares PHA degradable cull panels that were actively fished to PHA panels that were continuously soaked. PHA panels that were actively fished were calculated to reach the 20% weight degradation threshold within about 330 days. PHA panels that were continuously soaked were calculated to reach the 20% weight degradation threshold on average at about 90 days, and reach the 40% weight degradation threshold on average in about 180 days. Obviously, for different designs of the degradable component, failure could be likely at 10% weight loss, or perhaps not until 50% weight loss. The key feature is for the degradable component to degrade at a much faster rate when continuously soaked than when actively fished; for example, as shown in FIG. 1, it is preferable to use a degradable component that degrades at least twice as fast in a given time period (e.g., 2 months, 3 months, 4 months, 6 months, 8 months, 10 months, or 12 months) when continuously soaked than when actively fished.

In contrast to other degradable plastic materials, PHA cull panels have the unexpected advantage of degrading at a faster rate once continuously submerged than while being actively fished. This is an enormous benefit, as it allows one to meet the difficult balancing act described above. In fact, this important property allows a degradable component of fishing gear to have a desired durability while being actively fished, and rapid degradation to a point of almost certain failure after being continuously submerged.

Figure 2A:
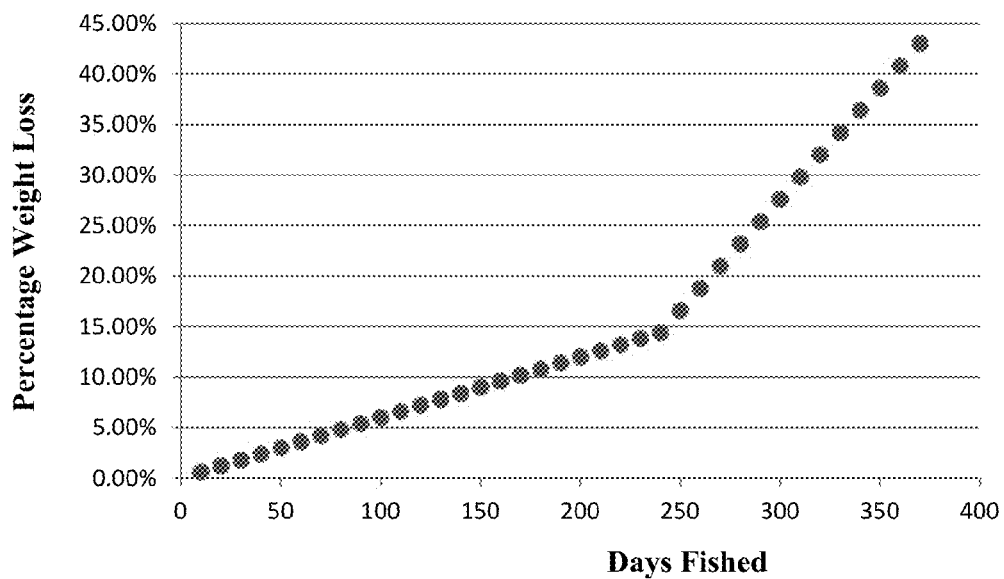
FIG. 2A shows an exemplary line graph plotting, as a function of time, the percentage loss of weight of a representative PHA degradable cull panel that is abandoned at 8 months.
Figure 2B:
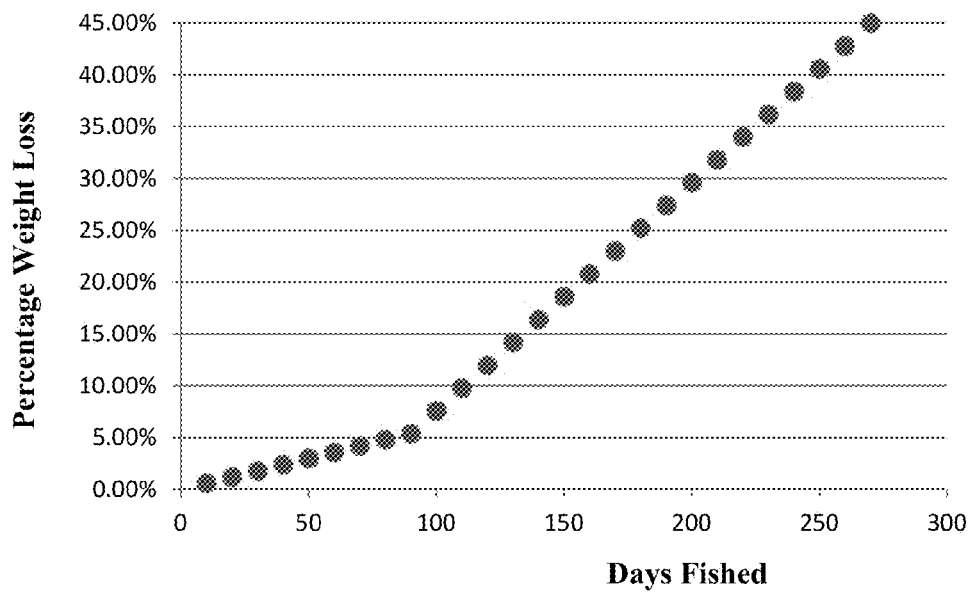
FIG. 2B shows an exemplary line graph plotting, as a function of time, the percentage loss of weight of a representative PHA degradable cull panel that is abandoned at 3 months.

FIGS. 2A and 2B demonstrate the implications of the dual rate of degradation. FIG. 2A shows the hypothetical degradation as a function of time for a representative PHA cull ring panel attached to a crustacean trap. Until approximately 8 months, the trap is actively fished, as shown by the dotted line through 240 days. The trap then becomes derelict, and the degradable cull ring panel is continuously soaked. The increased rate of degradation is shown by the dotted line after 240 days. FIG. 2B shows an analogous hypothetical graph for a crustacean trap that is abandoned after 90 days.

Without wishing to be bound by theory, we believe that an explanation for this important advantage of degradable cull panels made from PHA is that the degradation processes may rely on organisms that are susceptible to ultraviolet light and/or oxygen. When the degradable cull panels are periodically removed from the water during the fishing process (e.g., to harvest the trapped crustaceans and re-bait the traps), the exposure to light and oxygen may slow the degradation process. Additionally, the rapid movement of the trap during the fishing process, both from the banging that occurs on land or vessel, as well as the movement through water when the trap is being pulled from the water and returned to the water, could result in sloughing of organisms, slowing the degradation process.

There was no evidence that degradable cull ring panels adversely affect crab catch. In two experiments, see Examples 2 and 3 below, legal catches were similar (or greater) in abundance, biomass, and size in experimental pots with degradable cull ring panels as compared to standard pots with standard cull rings.

While degradable cull panels made from PHA have this significant unexpected advantage described above, the brittleness of some PHA formulations was unsuitable for use with some designs according to the methods of the invention. Even with only modest degradation by weight, some PHA formulations (e.g., MIREL™ P4001 and MIREL™ P1003, both available from Telles Inc. of Lowell, Mass.) were overly brittle when incorporated into our test designs, and failed during field testing long before substantial degradation had occurred. For example, the field testing process subjects degradable cull panels not only to being banged around by watermen, but also to challenges from crabs and other aquatic animals such as turtles. For example, degradable cull panels made from MIREL™ P4001 were field tested by five commercial watermen using 10 crab traps each, with two panels per pot. Of the 100 degradable cull panels tested, all failed prematurely during the fishing season and needed to be replaced, some of them multiple times. Generally, the mode of failure of these MIREL™ 4001 degradable cull panels was fracture at the edges. It is conceivable that improved designs (such as thicker panels) or advanced processing technique could eliminate or reduce these problems. However, there are economic advantages to keeping the degradable cull panels as thin and as simple to manufacture as possible, thereby keeping material and production costs low.

Continued field testing led to identification of a superior formulation that did not have significant failures due to brittleness. Enhanced toughness and ductility are key features of PHA polymers that are particularly useful for degradable cull panels. Accordingly, for some designs, in order to achieve the desired durability of degradable cull panels while they are being actively fished, it is important to use PHA formulations having tensile strength of at least 23 mPa when subjected to ASTM method D638, and a tensile elongation at break of at least 6% when subjected to ASTM method D638. For example, neither MIREL™ P4001 nor MIREL™ P1003 have tensile elongations at break of at least 6.0%, whereas MIREL™ P1004 formulations meet the above requirements (i.e., a tensile strength of 24 mPA, and a tensile elongation at break of 7%), and can be used to provide degradable cull panels of the present invention.

PHA polymers are true biopolymers, produced in nature by bacterial fermentation of sugar and lipids. They are linear polyesters, and more than 150 different monomers can be combined within this family to give polymers with a wide variety of properties. Some common PHA polymers include poly-3-hydroxybutyrate, polyhydroxyvalerate, and co-polymers thereof.

Figure 3:
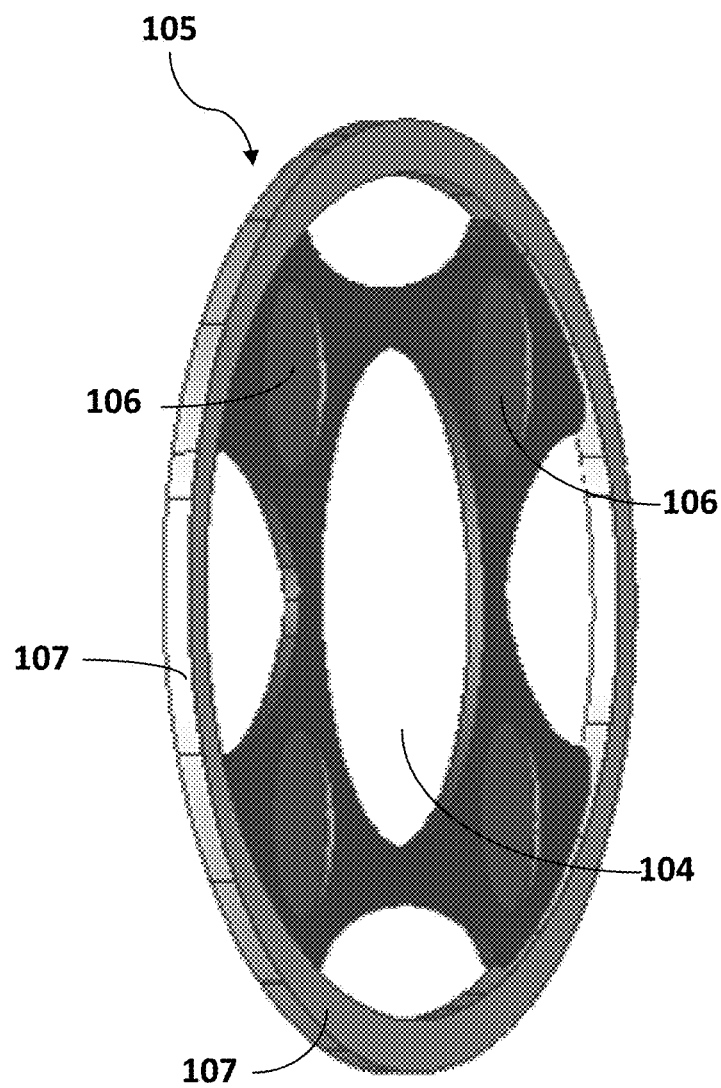
FIG. 3 shows a perspective image of one embodiment of a degradable cull panel 105.

A representative degradable cull panel (incorporating a cull/escape ring) suitable for attachment to crustacean traps, for example, is shown in representative FIG. 3. The degradable cull panels 105 are installed to be flush with the wall of the crustacean trap. The panel 105 includes an opening 104 (i.e., an escape ring, escape hatch) sufficient for the escape of small crustaceans, with the size of the escape ring typically specified by local fishing regulations. The degradable cull panel 105 is larger than the escape ring 104, and often as large as the entrance funnel to fulfill the desired function of allowing all trapped fish and shellfish to escape after degradation of the panel. The degradable cull panel 105 also includes fuses 106, or areas of reduced thickness, which provide the user with a visual cue as to the extent of degradation with respect to the degradable cull panel. The degradable cull ring panel also has through holes near the outer edge 107, as shown, which are useful attachment points to connect the cull panels to the trap. The outer edge 107 of the degradable cull panel has an increased thickness to enhance durability. There is often significant stress along the edge of the degradable cull panel, depending on the design, particularly in the vicinity of attachment points. Accordingly, in order to prevent premature failure of the degradable cull panel, it can be advantageous to reinforce the edges by making them thicker or wider. Note that FIG. 3 is a representative embodiment, but other embodiments of the invention can have different length, width, and/or thickness, or any other differences in the overall design, including imprinted or other legible markings (e.g., license number, identification information).

The cull ring panel has a degradable physical barrier, which could take a number of forms, including a solid panel, a lattice, a mesh, a gated structure, or any other structure that prevents the escape of mature specimens of the targeted species before the barrier breaks down. In one embodiment, the panel had a uniform thickness throughout the degradable cull panel. In FIG. 3, the thickness varied throughout the panel. In some of the embodiments, the degradable cull panel comprises a solid, impervious barrier surrounding the escape ring. Alternatively, the degradable cull panel can have a lattice structure, a hub-and-spoke arrangement, or any other design that is suitable to prevent escape of the targeted species, while also rendering the cull panel degradable within the preferred time frame.

Figure 4:
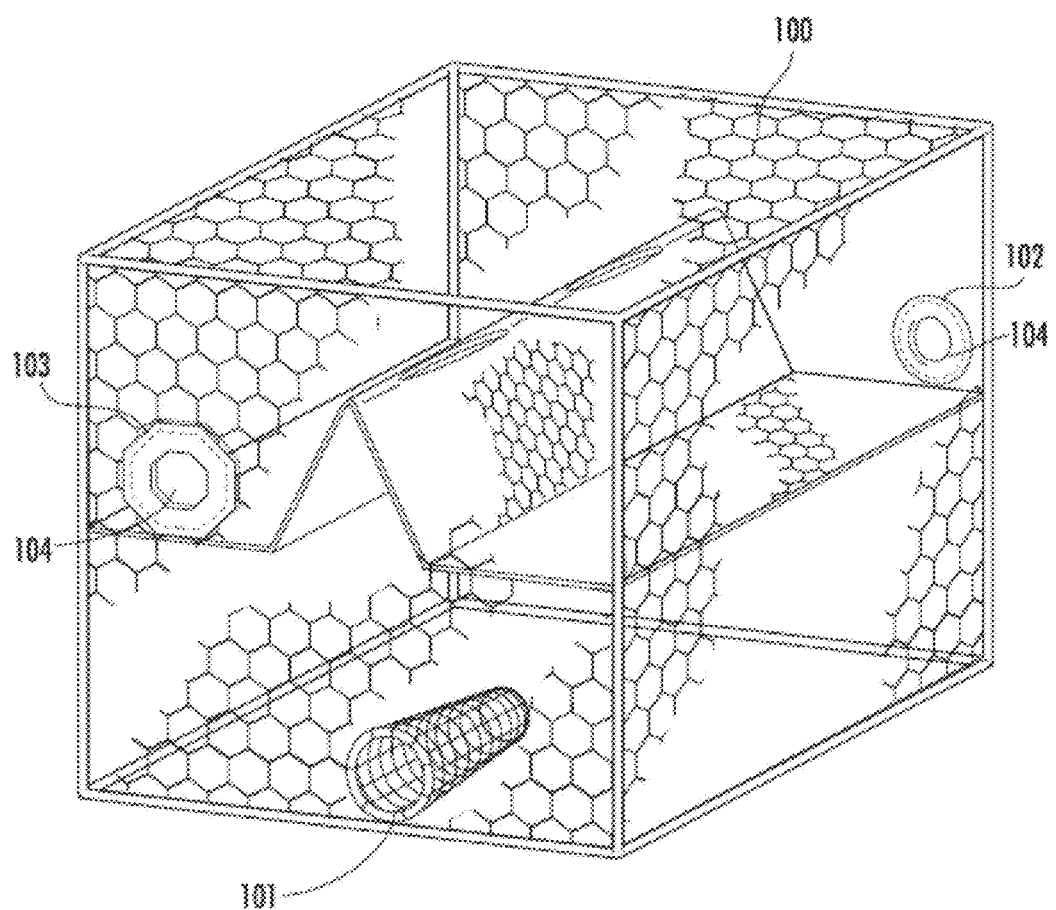
FIG. 4 shows a perspective view of a blue crab trap 100 which includes a throat, or entrance funnel, 101 and exit 110. Both the throat and the exit are located on vertical walls of the trap.

The methods and degradable components of the present invention are for use in fishing gear generally, including but not limited to, traps or nets for shellfish, fish, or other aquatic species. For example, FIG. 4 depicts a representative crab trap 100 having an entrance funnel 101 and exit 110, which can be of any shape. To be functional, a trap must have an entrance into the enclosed space. For blue crab traps, the entrance is called a throat, which is typically a funnel 101 extending into the trap 100. The trap often contains an additional opening, an exit 110, no smaller than the throat. Unobstructed, this opening would serve as an exit for all marine species that enter the trap. Fisherman must obstruct the exit in compliance with local, state, and regional regulations. As per Florida regulations, for instance, the exit can be obstructed with a non-degradable trap lid connected to a trap via degradable jute twine or corrodible hooks. However, existing connectors and panels obstructing the exit often fail to disconnect and thereby fail to release all captured species.

In one embodiment, the degradable component functions to obstruct an exit of the fishing gear. The degradable component can take the form of a panel, slat, gate, cull ring panel, cull ring, or other similar physical barrier. The degradable component comprises a polyhydroxyalkanoate polymer, with the dual rate of decay described previously. For instance, the degradable component can be similar in design to the degradable cull ring panel as shown in FIG. 3. Alternatively, the degradable component can be a panel without a cull ring or escape hatch, described below with respect to FIG. 5A. The panel comprises a physical barrier, which could take a number of forms, including a solid panel, a pervious panel such as a lattice structure or a mesh, ornamental designs such as a hub-and-spoke arrangement, or any other arrangement that obstructs the exit.

Figure 10:
FIG. 10 shows an image of a white universal panel 400, suitable for attachment to any fishing trap, against a dark background.

Another example of a degradable component lacking a large cull ring is the universal PHA panel shown in FIG. 10, which can be affixed to any fishing trap, using either the smaller holes or larger holes shown in the panel 400 to serve as attachment points to the fishing trap. Since it lacks a cull ring, but can be attached to any fishing gear and will degrade if the fishing gear is abandoned, the panel 400 is described as a universal panel, suitable for use irrespective of regulations regarding escape ring size. The panel 400 in FIG. 10 is made from PHA, has dimensions of approximately 5 inches by 7 inches by ⅛ inches in thickness, and degrades in aquatic environments. Other representative universal panels could be made using, for example, different dimensions, PHA formulations, colorants, and designs. When universal panel 400 is used to obstruct an exit of a fishing implement, it ultimately will degrade and leave the exit unobstructed if said fishing implement is abandoned.

The degradable component can be affixed to the wall of a trap, to a portion of the net, or to other fishing gear. In this embodiment, the degradable component obstructs the exit, which is an opening at least as large as the entrance. The sizing of the exit is sufficient to allow the escape of all species that enter the fishing gear. An exit can be incorporated easily into fishing gear (e.g., by cutting the existing wire mesh framework sufficiently to produce a hole as large as the entrance). In typical traps, for instance, exits can be introduced at the following locations: the junction of two panels, in the upper chamber of a trap, and/or touching the upper partition floor of a trap, or other locations on an exterior wall of a trap. The degradable component is then affixed to the fishing gear in order to obstruct the exit during the fishing season. The degradable component can be secured into place using methods known in the art, including fasteners, wire, twine, nails, screws, staples, clips, hinges, or ties, which may or may not be made from degradable materials. As previously mentioned, the degradable component comprising PHA will degrade faster when continuously soaked, rather than actively fished. This approach is cost-effective, easy to enforce, and user-friendly because replacement degradable components are easy to install.

Figure 5A:
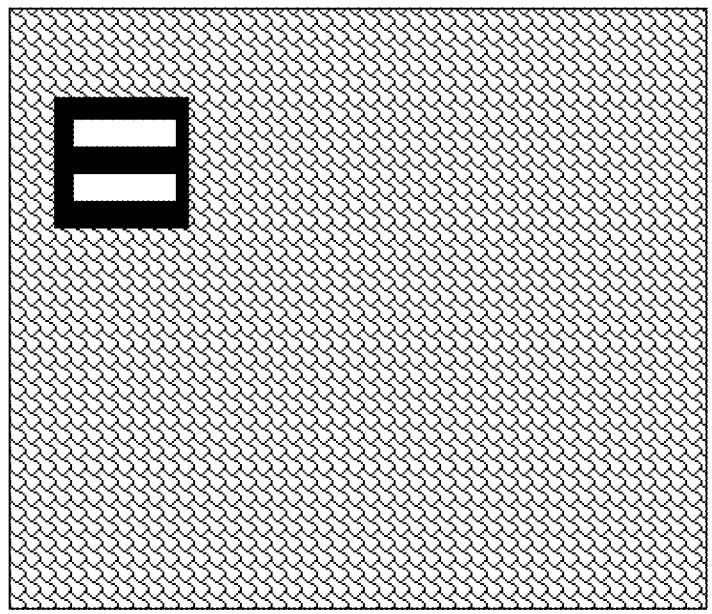
FIG. 5A shows a schematic diagram of a blue crab trap having a PHA panel prior to the onset of degradation.
Figure 5B:
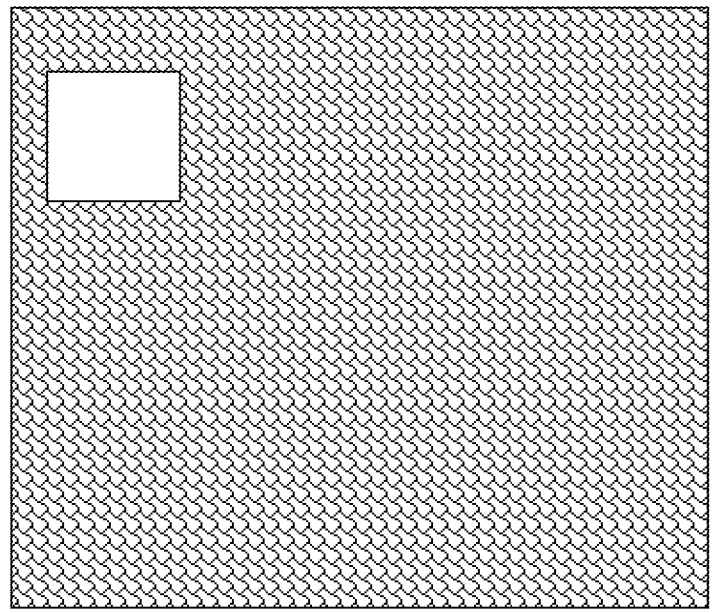
FIG. 5B shows a schematic diagram of a blue crab trap having a PHA panel that has degraded.

FIG. 5A is a schematic diagram showing the exterior wall of a trap with an intact degradable component, prior to the onset of degradation. FIG. 5B shows the same trap after the degradable panel has degraded. Notice that degradable component shown in FIG. 5A has openings, which may or may not conform to state regulations concerning cull rings. Rather, the openings may reduce material costs, provide water circulation within the trap, or serve as a point of weakness allowing faster degradation of the panel. Further, openings may serve as attachment points, wherein the panel can be connected to the trap using degradable or non-degradable fasteners. Commercial waterman typically must attach escape rings to traps to adhere to local fishing regulations. Attaching a degradable component is not significantly more burdensome.

Figure 6:
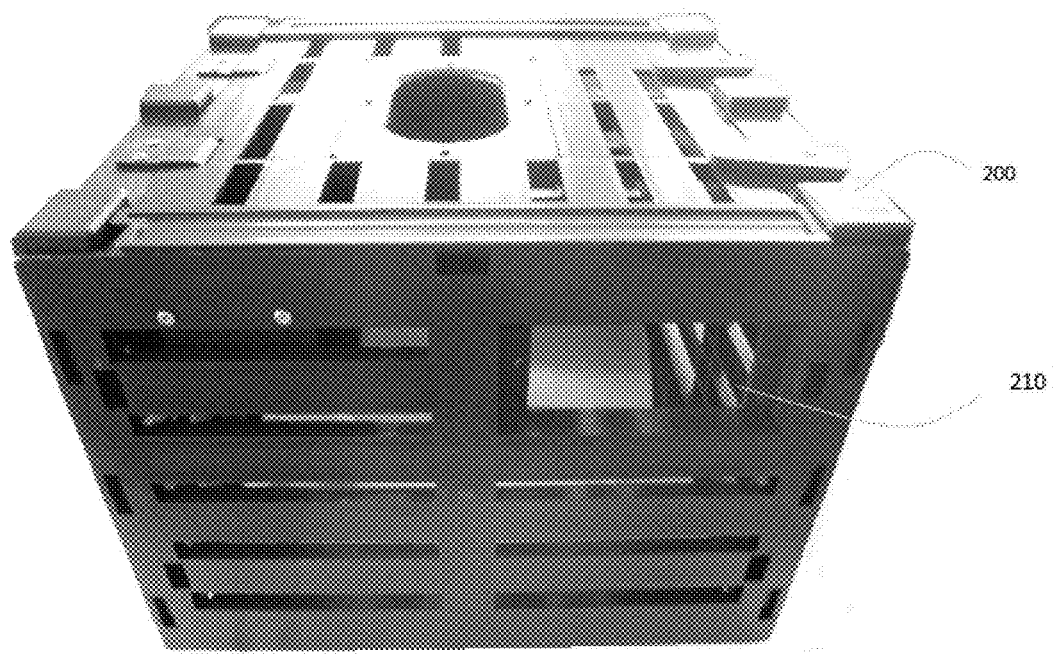
FIG. 6 shows a view of a stone crab trap 200 and exit 210.
Figure 7:
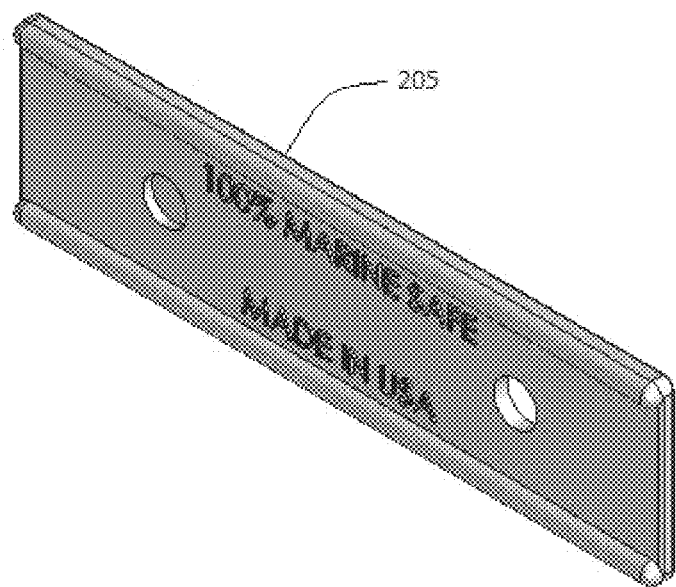
FIG. 7 shows a PHA degradable slat 205 for a stone crab trap.

FIG. 6 is a stone crab trap 200, wherein one exterior wall of the trap has an exit 210. The trap itself is typically constructed of non-degradable plastic slats. FIG. 7 is a schematic diagram of a degradable component, namely a PHA slat 205. As shown, the slat 205 has a raised upper and lower edge. There is often significant stress along the edge of the slat, depending on the design, particularly in the vicinity of attachment points. Accordingly, in order to prevent premature failure of the slat 205, it can be advantageous to reinforce the edges by making them thicker or wider. Alternatively, the slat may have uniform thickness for ease of manufacturing. The slat may also include fuses, or areas of reduced thickness, as described previously with respect to FIG. 3. The slat may include through holes, raised outer edges, or any other feature described in relation to degradable cull ring panels.

The slats 205 can be secured to the trap using methods known in the art. For instance, the slat may have two or more holes through which wire, nails, screws, staples, clips, ties, or other known fasteners may be used to secure the slats to the trap. The connectors themselves may or may not be made from degradable materials. Alternatively, a connector may be forcibly inserted through the slat (e.g., a screw is drilled through the slat and is connected to the underlying trap, without the use of pre-manufactured holes). The slat 205 is designed to obstruct only a portion of the exit 210 (e.g., open spaces above and/or below the slat after installation). Under normal use conditions, the degradable slat remains functionally intact for the duration of the fishing season, preventing the escape of the targeted species. After prolonged exposure to the aquatic environment, such as when the fishing gear becomes derelict, the slat degrades and all captured species may escape.

Figure 8:
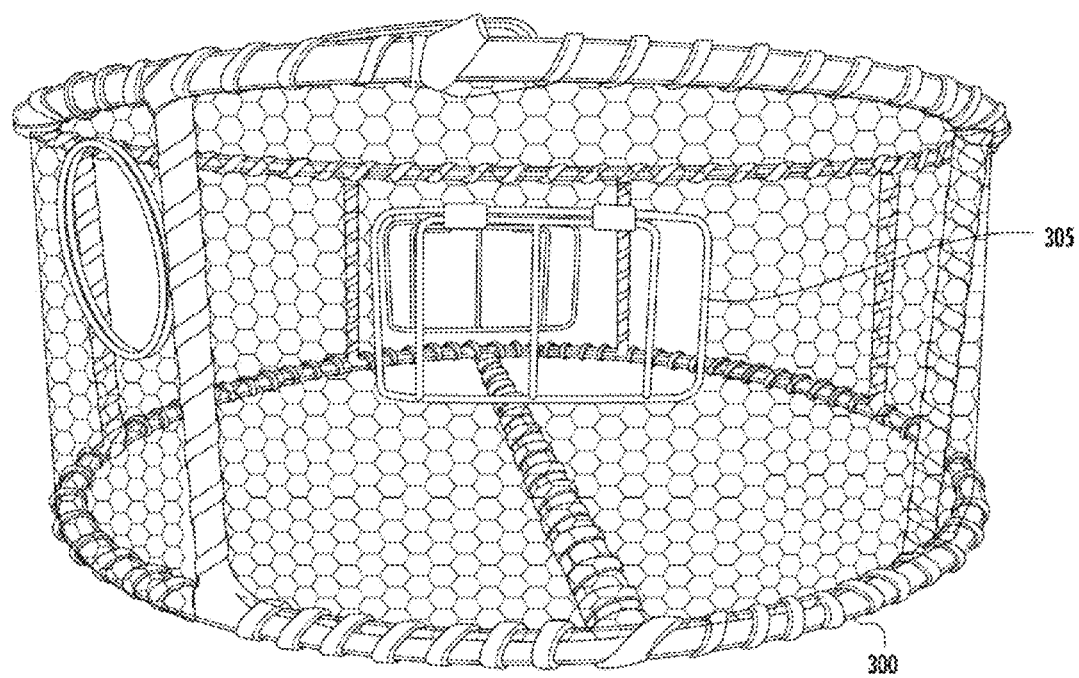
FIG. 8 shows a view of a Dungeness crab trap 300 which includes a one-way gate 305.

FIG. 8 is a Dungeness crab trap 300 constructed of a non-degradable metal material. The trap contains a one-way gate 305, as shown in greater detail in FIG. 9, which allows marine species to enter but not escape. Therefore, the gate itself functions to obstruct an exit of the fishing gear. The gate could be constructed of polyhydroxyalkanoate polymer and fasteners known in the art could attach the degradable gate to the trap. The degradable component, therefore, could take the form of a gate, one-way gate, or other gated structure that obstructs the exit. Upon prolonged exposure to the marine environment, the gate would degrade allowing trapped species to escape.

In one embodiment, the degradable component functions to connect to the fishing gear. The degradable component can take the form of a wire, nail, screw, staple, clip, hinge, tie, fastener, or other connector known in the art. The degradable component comprises a polyhydroxyalkanoate polymer, with the dual rate of decay described previously. The thickness and design of the connector could be modified in order for it to withstand active fishing for a desired length of time. PHA formulations having increased flexibility and toughness can be utilized, for example, to make a flexible connector design that can wrap around or surround parts of the fishing gear without breaking. A snap closure, zip-tie, or other mechanism that reversibly or irreversibly secures the connector can be incorporated into the design. Preferably, such flexible PHA formulations include ocean-safe plasticizers. Since the connector comprises PHA, the component can degrade faster when continuously submerged than when actively fished.

Figure 9:
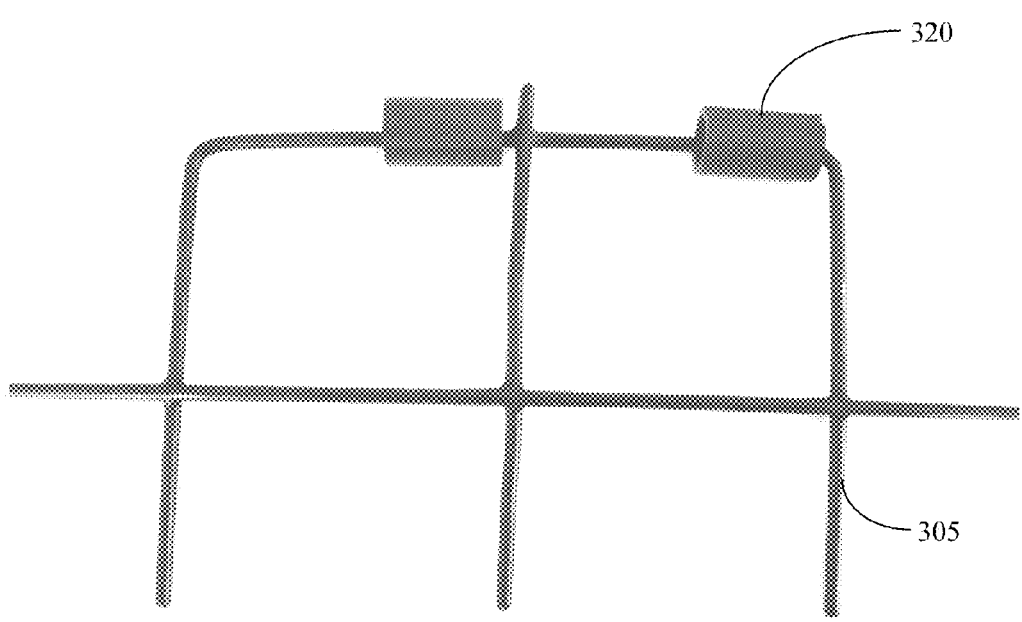
FIG. 9 shows an image of the one-way gate 305 for a Dungeness crab trap 300. Degradable clips 320 made from PHA are attached to the gate 305.

FIG. 8 shows a degradable component connecting the one-way gate 305 to the Dungeness crab trap 300. The degradable component is a PHA clip 320 that encompasses a portion of the trap 300 and the gate 305 in order to connect these features. FIG. 9 shows an enlarged photograph of the gate 305 and the PHA clips 320. The clips 320 are constructed as a round tube with a longitudinal slit. In operation, the slit is pushed onto a section of the trap, wherein a section of the trap fits within the internal cavity of the tube. The slit is forced to elastically deform but contracts to its original shape once attached to the trap. This process of attachment is repeated for the gate, thereby allowing the gate to be secured to the trap.

The degradable component that connects to the fishing gear can be used in conjunction with a degradable component that obstructs the exit. Therefore the entire apparatus that obstructs the exit and connects to the fishing gear can comprise a polyhydroxyalkanoate polymer. For instance, the Dungeness crab trap shown in FIG. 8 could comprise both a degradable, PHA one-way gate and a degradable, PHA clip. Other combinations are possible. For instance, a PHA fastener and PHA cull ring panel could be used in a blue crab trap.

The present invention requires that the degradable components comprise a polyhydroxyalkanoate polymer, regardless of whether the degradable component obstructs an exit or connects to the fishing gear. Moderating the rate of degradation can be achieved, for example, by altering any of a number of factors, including but not limited to: the molecular weight of the polymer, the choice of or concentration of plasticizer of other additives, a coating on the polymer, surface imperfections, or the design of the degradable component, in particular its thickness.

While many plastics have been described as being degradable, it is important to use only a polymer that legitimately degrades in an aquatic environment into monomers and oligomers. In order to be environmentally benign, it is advisable not to use plastics that will break apart into very small pieces that are themselves not biodegradable, and thus would accumulate in aquatic species. It is not desirable, for example, to use polypropylene formulations wherein the macrostructure of the plastic breaks down in an aquatic environment, but small pieces of polypropylene that do not biodegrade would then be ingested by aquatic organisms.

EXAMPLES

The examples that follow are intended in no way to limit the scope of this invention but instead are provided to illustrate representative embodiments of the present invention. Many other embodiments of this invention will be apparent to one skilled in the art.

Example 1

In a long term study of degradable cull panels made from PCL and PHA, degradable cull ring panels were deployed in crab traps that were either actively fished or submerged continuously. The PCL grade that was used was CAPA® 6500 (supplied by Perstorp UK Ltd., Cheshire, United Kingdom), a high molecular weight polycaprolactone that showed promise in preliminary studies. The PHA grade that was used was Mirel™ P1004, a polyhydroxyalkanoate formulation (including additives and mineral fillers) with high toughness that showed promise in preliminary studies, whereas some other polyhydroxyalkanoate formulations were brittle and had a high failure rate when being actively fished, irrespective of the extent of degradation. Utilizing a set schedule, the degradable cull panels were removed from the water, dried, and weighed at specified times. With the polymers and designs used in this Example, functional degradation of a degradable cull panel is unlikely to occur if degradation by weight is less than 20%, but functional degradation is very likely to occur when degradation by weight exceeds 40%.

Figure 11:
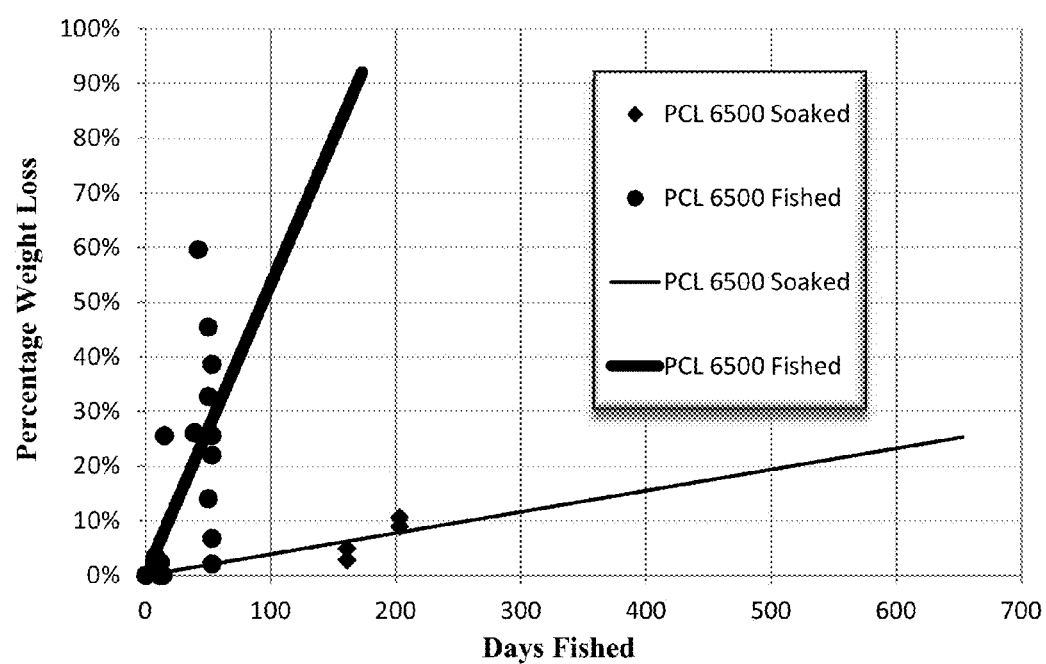
FIG. 11 shows a line graph plotting, as a function of time, the percentage loss of weight of polycaprolactone (PCL) degradable cull panels that were either fished or continuously soaked. Individual data points from field trials, as well as the lines of best fit for the fished and continuously soaked degradable cull panels, are shown.

As is apparent in FIG. 11, degradable cull panels made from PCL (CAPA® 6500) that were actively fished reached the 20% weight degradation threshold within about 45 days on average. As shown in FIG. 11, PCL panels that were continuously soaked, simulating an abandoned trap, did not reach the 20% weight degradation threshold until about 520 days. Setting aside any assumptions or line-fitting, none of the four PCL panels that were continuously soaked had greater than 11% weight degradation even after 200 days of being submerged continuously in an aquatic environment, whereas more than half of the PCL panels that were regularly fished showed greater than 20% weight degradation within 53 days (and in many cases sooner than that). Therefore, degradable panels made from PCL degraded much faster when actively fished than when continuously soaked. This is a marked contrast to degradable panels made from PHA, which degraded faster when continuously soaked than when actively fished, as described below.

Degradable cull panels made from PHA (Mirel™ P1004) panels that were actively fished reached the 20% weight loss threshold at about 330 days as shown in FIG. 1, based on line-fitting and assuming a linear rate of decay during the period of active fishing. In contrast, PHA panels that were continuously soaked (i.e., not regularly fished) reached the 20% weight degradation threshold on average at about 90 days, and reached the 40% weight degradation threshold on average in about 180 days (see FIG. 1). Of the eight PHA degradable cull panels that were continuously soaked, six of them reached at least 35% weight degradation within 86 days. The other two reached at least 18.5% degradation within 203 days. In other words, most of the samples failed or were on the verge of failure within 3 months. In contrast, of the 100 PHA degradable cull panels that were regularly fished, with weight sampling performed between 30 and 175 days, only one (out of 100) had reached the 20% weight degradation threshold at the time of its testing.

This is an unexpected and important result. PHA panels degraded faster when continuously submerged than when actively fished, which is ideal for the intended use of the degradable cull panels. In fact, as shown in FIG. 1, the component degrades by weight at least twice as much when the trap is abandoned and continuously submerged than when the trap is actively fished. It is not easy to balance the need for sufficient durability while the trap is actively fished with the need for rapid degradation once a trap becomes derelict. In contrast to other degradable polymer materials, PHA cull panels had the unexpected advantage of degrading at a faster rate once continuously submerged than while being actively fished. This is an enormous benefit, as it allows one to meet the difficult balancing act described above.

Example 2

Oval biodegradable cull panels were constructed of either polycaprolactone (PCL) or polyhydroxyalkanoate (PHA). The length of the panel was 150 mm, the width was 100 mm at the widest point, and the thickness was 1.5 mm. Each degradable cull panel included an escape ring of 60 mm (2⅜ in) inside diameter (to correspond to the regulation cull ring size used in standard pots). An oval section of crab pot wire of the same size was removed from opposite sides of the upper chamber of the crab pot and the panels attached using polyamide (nylon) cable ties. Cull ring position was kept consistent for standard and experimental pots.

During the spring (March/April), early summer (May/June) and fall (October/November), two lines with 20 crab pots each (40 pots total) were fished by licensed commercial watermen in the Lower York River, Va. Each line consisted of 10 pairs of pots. The standard (control) crab pots had 2 cull rings and the experimental crab pots had 2 biodegradable cull ring panels. Pairs of pots were placed next to each other along the line (i.e. standard, experimental, standard, experimental). The two lines of pots were considered experimental units and the individual pots considered subsamples. Pots were fished in a manner consistent with commercial fishing practices in that early and late in the season, when catches decline, traps were fished over a 48 hour period, whereas in the middle of the season, when catches increase, the traps were retrieved daily. Experimental and standard pots were similarly baited with seasonally available bait: clams, Atlantic croaker, alewife and bluefish. The numbers and sizes of legal and sublegal crabs were recorded for each trap and fishing period.

Legal status was determined in the field based on whether an individual crab could fit in a regulation sized cull ring (60 mm (2⅜ in)) for Virginia. Biomass was estimated from carapace width (CW) using the following equations known in the art:

$$\text{Biomass}_{female}=0.000355 \cdot 2.571(CW)$$

$$\text{Biomass}_{male}=0.00027 \cdot 2.571(CW)$$

For each pot and sampling event, the number and biomass of crabs were summed and the mean catch size estimated. Within a given line (experimental unit), catch information was then averaged across subsamples for each sample date and pot type to obtain catch per pot per day estimates for the standard and experimental pots. Several pots were lost or damaged, reducing the number of subsamples for that given sampling event. If a single pot of a pair was lost, then the corresponding pair was removed to ensure a balanced number of samples per pot type remained (out of a potential of 2360 samples, 96 samples were removed). During any given sampling date, there were never less than 8 subsamples per pot type and line, with the single exception of October 12 when only one line was fished.

The effect of pot type (standard, experimental cull panel), season (spring, summer, fall), and time of pot submersion (24, 48 hours) on the number, biomass and size of blue crabs caught was assessed with generalized linear models (SPSS 17.0). Total, legal-size and sublegal-size crabs were examined separately. For all comparisons, a regression model using a normal distribution and identity link function was applied to untransformed data.

Results: Over the 59 days on which fishing was conducted in the York River, 13,711 crabs were captured in 234 samples. In standard pot samples (n=117), 6553 total crabs were captured (5664 legal-size, 889 sublegal-size). In experimental pot samples (n=117), 7158 total crabs were captured (6362 legal-size, 796 sublegal-size). The majority of crabs captured were female (67%) for both standard and experimental pots (standard: 4355 female, 2167 male; experimental: 4752 female, 2386 male). The sex of 51 crabs was unidentified.

The number of crabs caught was similar between standard and experimental pots for legal-size crabs (standard: mean [SE]=4.9 crabs per pot per day [0.2]; experimental: mean [SE]=5.5 crabs per pot per day [0.2]) and sublegal-size (standard: mean [SE]=1.5 crabs per pot per day [0.1]; experimental: mean [SE]=1.3 crabs per pot per day [0.1]). The mean abundance of legal-size crabs caught was higher in summer (mean [SE]=6.1 crabs per pot per day [0.3]) than in spring and autumn (mean [SE]=4.7 crabs per pot per day [0.2] and 4.7 crabs per pot per day [0.3], respectively). Sublegal crab catch was similar among seasons (mean [SE]=approximately 1.4 crabs per pot per day [0.1]). When pots were submerged for 48 hours, the number of legal-size crabs increased from mean [SE] 4.3 to 6.2 crabs per pot per day [0.2]. Sublegal-size crab catch was similar between pot submersion periods (mean [SE]=1.4 crabs per pot per day [0.1]). The pattern of estimated mean biomass was similar to the abundance pattern.

Mean size of legal-size crabs was slightly larger in experimental pots (mean [SE]=14.0 cm per pot per day [0.04]) than standard pots (mean [SE]=13.9 cm per pot per day [0.04]). Sublegal crab sizes were similar between pot types. Legal-size crabs were on average 2.0 to 3.0 mm larger in the spring than in summer and autumn, and sublegal crabs were on average 2.0 mm larger in autumn than in spring and summer.

Example 3

Oval biodegradable cull ring panels were produced from either PCL or PHA. The length of the panel was 150 mm, the width was 100 mm at the widest point, and the thickness was 1.5 mm. Each panel included a cull ring of 60 mm (2⅜ in) inside diameter (to correspond to the regulation cull ring size used in standard pots). An oval section of crab pot wire of the same size was removed from opposite sides of the upper chamber of the crab pot and the panels attached using polyamide (nylon) cable ties. Cull ring position was kept consistent for standard and experimental pots. During the spring (April/May), summer (July/August) and fall (October/November), a line of 10 crab pots were fished by licensed watermen in 5 locations of the Lower Chesapeake Bay. Pots were fished at 1) Eastern Shore (Lower Bay), 2) York River, 3) James River, 4) Wicomico (Western shore of upper Bay near Great Wicomico River), and 5) Tangier Island. Each line consisted of 5 pairs of pots. The standard (control) crab pots had 2 cull rings and the experimental crab pots had 2 biodegradable cull panels, made from either PCL or PHA. Pairs of pots were placed next to each other along the line (i.e. standard, experimental, standard, experimental). Each line of pots was considered an experimental unit and the individual pots were considered subsamples.

Pots were fished in conjunction with commercial fishing for five consecutive days each season. Experimental and standard pots were similarly baited with seasonally available bait. The numbers and sizes of crabs were recorded for each trap and fishing period. A crab was designated as legal-size if it exceeded 12.5 cm. Fish bycatch were noted. Biomass was estimated from carapace width (CW) using the equations described in Example 2 above.

For each pot and sampling event, the number and biomass of crabs were summed and the mean catch size estimated. Within a given line (experimental unit), catch information was then averaged across subsamples for each sample date and pot type to obtain catch per pot per day estimates for the standard and experimental pots. The effect of pot type (standard, experimental cull panel), season (spring, summer, fall), and location (Eastern Shore, York River, James River, Wicomico, Tangier) on the number, biomass and size of blue crabs caught was assessed with generalized linear models (GLZ). Total, legal-size and sublegal-size crabs were examined separately. For all comparisons, a regression model using a normal distribution and log link function was applied to data.

Results: Over the 77 days on which fishing was conducted in the five regions, 8,486 crabs were captured in 1,524 samples. Whereas each fisher was anticipated to fish for 15 days, one fished for 14 days (York River) and one fished for 18 days (James River). In standard pot samples (n=762), 4,369 crabs were captured (3,958 legal size, 411 sublegal size). In experimental pot samples (n=762), 4,117 total crabs were captured (3,663 legal size, 454 sublegal size). The majority of crabs captured were female (73%) for both standard and experimental pots (standard: 3,192 female, 1,135 male; experimental: 2,984 female, 1,090 male). The sex of 42 crabs was unidentified.

Number of crabs caught was similar between standard and experimental pots for both legal-size (standard: 9.3 crabs per pot per day [0.4]; experimental: 8.6 crabs per pot per day [0.4]) and sublegal-size crabs (standard: 1.6 crabs per pot per day [0.3]; experimental: 1.8 crabs per pot per day [0.3]). On average, approximately three more legal-size crabs per pot per day were captured in summer than in spring and autumn. Legal-size catches from the Eastern Shore (16.7 crabs per pot per day [0.8]) were higher than other locations (range 6.6-9.8 crabs per pot per day)). Catches of sublegal-size crabs were similar among most locations (range: 1.6-1.9 crabs per pot per day [0.3]), but were slightly lower in Wicomico River (1.4 crabs per pot per day [0.1]). An interaction between season and location was observed for mean catch of legal and sublegal-size crabs. From summer to autumn, mean catch declined more in northern locations (Tangier and Wicomico) than in southern locations (James and Eastern Shore). In York River only, the number of crabs caught declined from spring to summer and then increased in the autumn. The pattern of estimated mean biomass was similar to the abundance pattern.

Mean size of legal crabs (14.6 cm) was similar in standard and experimental pots. Sublegal crabs were on average 2 mm larger in experimental (11.7 cm) than standard pots (11.5 cm). In spring and autumn, legal-size crabs were on average 3-4 mm larger than in summer months. Sublegal-size crabs were 3-4 mm smaller in spring than summer and autumn. Mean legal crab size was approximately 6-10 mm larger in James, York, and Wicomico Rivers (mean range: 14.9-15.1 cm) than in Tangier (14.3 cm) and Eastern Shore locations (14.1 cm). On average, sublegal crab size was 2 mm larger in Tangier and Eastern Shore locations (11.7 cm) than in all other areas (11.5 cm). An interaction between season and location was observed for mean size of legal and sublegal-size crabs.

Example 4

Degradable cull ring panels for lobster pots were produced from PHA using an injection molding process. These degradable cull panels had eight attachment points (e.g., for wire clips), situated two in each corner. The escape hatch is a rectangle having an area of 1.875 inches by 5.875 inches. The largest length of these degradable cull panels is 7.875 inches, and the largest width is 5.25 inches. The thickness (prior to use) of the degradable cull panels is 0.125 inches (1/8 inch thick), with weights of about 80.5 g or 75.8 g, depending on the formulation of PHA that is used. Field testing of the panels during the late fall and winter showed increasing degradation as a function of time in the water (with testing after 30, 55, and 92 days). The data suggests that degradable cull ring panels for lobster pots have sufficient durability to withstand an active fishing season. Other variables included the placement of the cull ring panel on the trap, either on the side or the bottom, with increasing degradation occurring when panels were on the side of the trap.

Example 5

Degradable slats intended to obstruct the exit of stone crab traps were produced from PHA using an injection molding process. These degradable slats resembling the schematic image in FIG. 6 were affixed to stone crab traps similar to the trap shown in FIG. 7 by screwing them directly to the trap. Each stone crab trap had one slat that obstructed the exit, with open space above and below the slat. These slats weighed between 20 g and 22 g, depending on the PHA formulation that was used. Field testing of the slats in the Chesapeake Bay during the late fall and winter showed increasing degradation as a function of time in the water (with testing after 30, 55, and 92 days). The data suggests that degradable slats for stone crab traps have sufficient durability to withstand an active fishing season. Other variables included the placement of the slats on the trap, either on the side or the bottom, with increasing degradation occurring when panels were on the side of the trap.

Incorporation by Reference

All publications, patents, and patent applications cited herein are hereby expressly incorporated by reference in their entirety and for all purposes to the same extent as if each was so individually denoted.

Equivalents

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a trap" means one trap or more than one trap.

Any ranges cited herein are inclusive.

We claim:

1. An apparatus comprising:
   a fishing implement having a boundary defining an enclosed space sufficient to house a targeted aquatic species;
   an entrance in said boundary sufficient to allow said targeted aquatic species to enter said enclosed space;
   an exit in said boundary, wherein said exit is at least as large as said entrance;
   an element that both obstructs said exit and connects to said fishing implement;
   wherein a component of said element comprises a polyhydroxyalkanoate polymer;
   wherein said component degrades by weight at least twice as much when said fishing implement is continuously submerged for three months than when said fishing implement is actively fished for three months, wherein when said fishing implement is actively fished for three months said fishing implement is temporarily removed from water being fished at least once every 48 hours;
   and wherein said element physically prevents escape of said targeted aquatic species for a period of at least two months when said fishing implement is actively fished.

2. The apparatus of claim 1, wherein said component is a panel that obstructs said exit.

3. The apparatus of claim 2, wherein said panel comprises a cull ring through which juvenile members of the targeted aquatic species can escape.

4. The apparatus of claim 2, wherein said panel has at least one additional feature selected from the group consisting of a fuse, a through hole, and a raised outer edge.

5. The apparatus of claim 1, wherein said component is a gate that obstructs said exit.

6. The apparatus of claim 1, wherein said component is a slat that obstructs said exit.

7. The apparatus of claim 1, wherein said component is a cull ring that obstructs said exit.

8. The apparatus of claim 1, wherein said component is a fastener that connects to said fishing implement.

9. The apparatus of claim 8, wherein said fastener encompasses a portion of said fishing implement.

10. The apparatus of claim 1, wherein said targeted aquatic species is selected from the group consisting of fish and shellfish.

11. The apparatus of claim 1, wherein said polyhydroxyalkanoate polymer has a tensile strength of at least 23 mPa when subjected to ASTM method D638, and wherein said polyhydroxyalkanoate material has a tensile elongation at break of at least 6% when subjected to ASTM method D638.

12. The apparatus of claim 1, wherein said component loses less than 20% of its weight when actively fished for six months in an aquatic environment; and wherein said component loses more than 20% of its weight when continuously soaked for six months in an aquatic environment.

13. The apparatus of claim 12, wherein said component loses less than 20% of its weight when actively fished for six months in an aquatic environment; and wherein said component loses more than 40% of its weight when continuously soaked for six months in an aquatic environment.

14. The apparatus of claim 1, wherein said fishing implement is rendered ineffective to capture aquatic life within about eight months of said fishing implement being continuously submerged in an aquatic environment.

15. The apparatus of claim 1, wherein said aquatic environment is selected from the group consisting of the Atlantic Ocean, Pacific Ocean, Gulf of Mexico, bays, rivers, and lakes.

* * * * *